(12) United States Patent
Ikegami et al.

(10) Patent No.: US 8,508,837 B2
(45) Date of Patent: Aug. 13, 2013

(54) METHOD OF MANUFACTURING ELECTROPHORETIC DISPLAY DEVICE

(75) Inventors: Kanami Ikegami, Soka (JP); Daigo Morizumi, Hino (JP)

(73) Assignee: Dai Nippon Printing Co., Ltd., Tokyo-To (JP)

( * ) Notice: Subject to any disclaimer, the term of this patent is extended or adjusted under 35 U.S.C. 154(b) by 0 days.

(21) Appl. No.: 13/574,899

(22) PCT Filed: Jan. 25, 2011

(86) PCT No.: PCT/JP2011/051309
§ 371 (c)(1),
(2), (4) Date: Jul. 24, 2012

(87) PCT Pub. No.: WO2011/093264
PCT Pub. Date: Aug. 4, 2011

(65) Prior Publication Data
US 2012/0293859 A1 Nov. 22, 2012

(30) Foreign Application Priority Data

Jan. 27, 2010 (JP) ................................. 2010-015606
Apr. 16, 2010 (JP) ................................. 2010-095201

(51) Int. Cl.
*G02B 26/00* (2006.01)
*G09G 3/34* (2006.01)

(52) U.S. Cl.
USPC ........................... 359/296; 359/245; 345/107

(58) Field of Classification Search
USPC ................ 359/245, 296; 345/107; 156/209, 156/220; 430/311; 313/484, 582, 583; 349/2; 29/592.1, 729
See application file for complete search history.

(56) References Cited

U.S. PATENT DOCUMENTS

| 6,887,650 B2 * | 5/2005 | Shimoda et al. ............. 430/311 |
| 6,940,634 B2 * | 9/2005 | Ukigaya ....................... 359/296 |
| 7,245,414 B2 * | 7/2007 | Liang et al. .................. 359/265 |
| 7,321,459 B2 * | 1/2008 | Masuda et al. ............... 359/296 |

(Continued)

FOREIGN PATENT DOCUMENTS

| JP | A-2004-252271 | 9/2004 |
| JP | A-2006-184893 | 7/2006 |
| JP | A-2007-279434 | 10/2007 |
| JP | A-2009-271387 | 11/2009 |
| WO | WO 2005/026832 A1 | 3/2005 |

OTHER PUBLICATIONS

International Search Report issued in International Patent Application No. PCT/JP2011/051309 dated Mar. 22, 2011.

(Continued)

*Primary Examiner* — Loha Ben
(74) *Attorney, Agent, or Firm* — Oliff & Berridge, PLC (57) ABSTRACT

A method of manufacturing an electrophoretic device includes: forming a partition wall on a one substrate with a predetermined pattern; forming an adhesive layer on the partition wall; filling each region as a cell, which has been partitioned by the partition wall, with a display medium, after having formed the adhesive layer; and adhering the other substrate onto the adhesive layer on the partition wall so as to enclose the display medium. The forming of the adhesive layer is performed, with the use of a transfer film with a heat sealing agent formed thereon, by heat-transferring the heat sealing agent. The adhering of the other substrate includes heating the heat sealing agent for again softening the heat sealing agent, which has been transferred as the adhesive layer, so as to obtain an adhesive force.

10 Claims, 4 Drawing Sheets

(56) References Cited

U.S. PATENT DOCUMENTS

| | | | |
|---|---|---|---|
| 7,324,264 B2* | 1/2008 | Aylward et al. | 359/296 |
| 7,604,706 B2* | 10/2009 | Otokawa et al. | 156/209 |
| 7,679,815 B2* | 3/2010 | Kobayashi et al. | 359/296 |
| 2007/0029931 A1 | 2/2007 | Kobayashi et al. | |

OTHER PUBLICATIONS

International Preliminary Report on Patentability issued in International Patent Application No. PCT/JP2011/051309 issued Dec. 12, 2011 (with translation).

* cited by examiner

FIG. 1

MANUFACTURE OF TRANSFER FILM

APPLYING HEAT SEALING AGENT

FORMING ADHESIVE LAYER ON PARTITION WALL

HEATING AND LAMINATING TRANSFER FILM ON BP WITH PARTITION WALL

WHEN TRANSFER FILM IS PEELED OFF, HEAT SEALING AGENT IS MELTED AND TRANSFERRED ONTO PARTITION WALL

F I G. 2

F I G. 3

※ IN ORDER TO DRAW FP ELECTRODE TO REAR SURFACE, THERE IS PERFORMED CONNECTION BY CONDUCTIVE PASTE.

※ BY APPLYING VOLTAGE TO ELECTRODE PATTERN OF BP AND FP ELECTRODE TO DRIVE PARTICLES, EACH CHARACTER PATTERN IS DISPLAYED. WHEN NO VOLTAGE IS APPLIED, PARTICLES ARE NOT DRIVEN.

FIG. 4

WHEN TRANSFER FILM IS HEATED AND PEELED OFF, HEAT SEALING AGENT IS HEAT-TRANSFERRED ONTO PARTITION WALL.

FIG. 5

METHOD OF MANUFACTURING ELECTROPHORETIC DISPLAY DEVICE

FIELD OF THE INVENTION

The present invention relates to a method of manufacturing an electrophoretic display device applied to electronic paper or the like.

BACKGROUND ART

An electrophoretic display device is a device for displaying information, by utilizing electric migration of electrophoretic elements (generally particles that electrically migrate) in an air or a solvent, i.e., movement of particles. In general, an electric migration condition is controlled by applying an electric field between two substrates, so that a desired display can be achieved.

Application of an electrophoretic display device particularly to electronic paper has been widely regarded in recent years. When applied as electronic paper, the electrophoretic display device has advantages such as visibility of printed matter level (easy on the eyes), easiness in rewriting of information, low power of consumption, light weight and so on.

However, in the electrophoretic display device, unsatisfactory display, in particular, low contrast may sometimes occur, because of precipitation or uneven distribution of particles. In order to prevent this phenomenon, a partition wall is formed between upper and lower electrode substrates, so as to divide a space in which particles migrate (electrophoretic space or moving space) into small spaces. The small space is called as cell or pixel. Each of the cells encloses electrophoretic elements that electrically migrate or an ink containing the electrophoretic elements.

When a material as a substrate is a film, since the film can be easily deformed, there is a problem in that a gap is likely to be defined between the partition wall and the electrode substrate(s). Thus, it is important to reliably adhere the partition wall and the electrode substrate(s), so as to prevent the ink from passing through or moving in the gap between the partition wall and the electrode substrate(s).

JP2006-184893A (Patent Document 1) discloses a method of manufacturing a technical-information display panel, which is a kind of the electrophoretic display device, by forming, with high accuracy at low costs, an adhesive layer on an upper surface of a partition wall formed on a substrate. To be specific, there is disclosed a method in which a roll coated with an adhesive agent (ultraviolet curing resin or thermosetting resin) is rotated, so that the adhesive agent is transferred onto a partition wall under a room temperature.

SUMMARY OF THE INVENTION

The inventor of the present invention has found that the technique disclosed in JP2006-184893A (Patent Document 1) has a problem that is caused by volatilization of solvent of the adhesive agent. Namely, there is a possibility that, after the adhesive agent has been applied to a surface, the surface might have irregularities because of volatilization of solvent of the adhesive agent, which invites unsatisfactory adhesion. Further, it has been found that, as a result of volatilization of solvent of the adhesive agent, the adhesive agent might enter a cell region or a pixel region that is not desired to be coated therewith, which degrades display quality.

The present invention has been made in view of the above circumstances. The object of the present invention is to provide a method of manufacturing an electrophoretic display device, which is a simple process but is capable of applying an adhesive agent onto only a partition wall and of reliably adhering the partition wall for forming cells and an electrode substrate to each other.

The present invention is a method of manufacturing an electrophoretic display device including a plurality of cells between opposed two substrates at least one of which is transparent, a display medium containing electrophoretic elements of at least one or more kind(s) being enclosed in each cell, and the display medium being configured to display predetermined information when a predetermined electric field is applied between the two substrates, the method of manufacturing an electrophoretic display device comprising: forming a partition wall on a one substrate with a predetermined pattern; forming an adhesive layer on the partition wall; filling each region as a cell, which has been partitioned by the partition wall, with a display medium, after having formed the adhesive layer; and adhering the other substrate onto the adhesive layer on the partition wall so as to enclose the display medium; wherein the forming of the adhesive layer is performed, with the use of a transfer film with a heat sealing agent formed thereon, by heat-transferring the heat sealing agent, and the adhering of the other substrate includes heating the heat sealing agent for again softening the heat sealing agent, which has been transferred as the adhesive layer, so as to obtain an adhesive force.

According to the present invention, by using the heat sealing agent as an adhesive agent, the partition wall for forming cells and the other substrate can be reliably adhered to each other, although by a simple process. In addition, since the transfer film is used when the heat sealing agent is heat-transferred, an accurate alignment thereof on the partition wall is not necessary, and the heat sealing agent can be reliably heat-transferred onto only an upper surface of the partition wall.

Preferably, the forming of the adhesive layer further includes peeling off the transfer film while heating the transfer film. The inventor of the present invention has found that, due to such a heating peel step, a desired shape accuracy of the partition wall pattern can be easily obtained. Details thereof will be described below.

In addition, preferably, in the forming of the adhesive layer, the heat sealing agent comprises a thermoplastic material. When the heat sealing agent, which has been heat-transferred as the adhesive layer, comprises a thermoplastic material, since such a heat sealing agent has no tackiness (stickiness) in a room temperature, handling thereof is very easy. In addition, due to the heat sealing agent free of tackiness (stickiness), the subsequent step of filling the display medium can be facilitated. For example, even when the display medium is filled by using a squeegee or the like, there is no possibility that the display medium might adhere to the heat sealing agent.

Moreover, when the heat sealing agent is made of a thermoplastic material, since the the other substrate is reliably adhered by heating the heat sealing agent, the adhering portion is prevented from being peeled off even when the other substrate is deformed. Namely, there is generated no gap into which the display medium is undesirably moved. In addition, since there is no possibility that impurities might enter the cell upon adhesion of the other substrate, deterioration of display quality can be avoided. Further, since the heat sealing agent after having been adhered to the other substrate does not have tackiness (stickiness) in a normal temperature, there is also no possibility that the display medium might adhere to the heat sealing agent. Also in this point, deterioration of display quality can be avoided.

Preferably, the adhering of the other substrate further includes pressurizing the other substrate to obtain an adhesive force, by applying thereto a predetermined pressurizing force. In this case, the other substrate can be more reliably adhered.

In addition, a thickness of the heat sealing agent is preferably in a range between 1 μm and 100 μm, more preferably in a range between 1 μm and 50 μm, and most preferably in a range between 1 μm to 10 μm.

In addition, a thickness of the partition wall is preferably in a range between 5 μm and 100 μm, and more preferably in a range between 10 μm and 50 μm.

In addition, the present invention is an apparatus for manufacturing an electrophoretic display device including a plurality of cells between opposed two substrates at least one of which is transparent, a display medium containing electrophoretic elements of at least one or more kind(s) being enclosed in each cell, and the display medium being configured to display predetermined information when a predetermined electric field is applied between the two substrates, the apparatus for manufacturing an electrophoretic display device comprising: a partition-wall forming unit configured to form a partition wall on a one substrate with a predetermined pattern; an adhesive-layer forming unit configured to form an adhesive layer on the partition wall; a display-medium filling unit configured to fill each region as a cell, which has been partitioned by the partition wall, with a display medium, after the adhesive layer has been formed; and a the-other-substrate adhering unit configured to adhere the other substrate onto the adhesive layer on the partition wall so as to enclose the display medium; wherein the adhesive-layer forming unit is configured to heat-transfer, with the use of a transfer film with a heat sealing agent formed thereon, the heat sealing agent; and the the-other-substrate adhering unit is configured to again soften the heat sealing agent that has been transferred as the adhesive layer.

Preferably, the adhesive-layer forming unit is further configured to peel off the transfer film while heating the transfer film. The inventor of the present invention has found that, due to such a heating peel step, a desired shape accuracy of the partition wall pattern can be easily obtained (details thereof will be described below).

In addition, preferably, in the adhesive-layer forming unit, the heat sealing agent is made of a thermoplastic material. When the heat sealing agent, which has been heat-transferred as the adhesive layer, is made of a thermoplastic material, since such a heat sealing agent has no tackiness (stickiness) in a room temperature, handling thereof is very easy. In addition, due to the heat sealing agent free of tackiness (stickiness), the subsequent step of filling the display medium can be facilitated. For example, even when the display medium is filled by using a squeegee or the like, there is no possibility that the display medium might adhere to the heat sealing agent.

Moreover, when the heat sealing agent is made of a thermoplastic material, since the the other substrate is reliably adhered by heating the heat sealing agent, the adhering portion is prevented from being peeled off even when the other substrate is deformed. Namely, there is generated no gap into which the display medium is undesirably moved. In addition, since there is no possibility that impurities might enter the cell upon adhesion of the other substrate, deterioration of display quality can be avoided. Further, since the heat sealing agent after having been adhered to the other substrate does not have tackiness (stickiness) in a normal temperature, there is also no possibility that the display medium might adhere to the heat sealing agent. Also in this point, deterioration of display quality can be avoided.

It is preferable that the the-other-substrate adhering unit is further configured to apply a predetermined pressurizing force.

In addition, the present invention an electrophoretic display device including a plurality of cells between opposed two substrates at least one of which is transparent, a display medium containing electrophoretic elements of at least one or more kind(s) being enclosed in each cell, and the display medium being configured to display predetermined information when a predetermined electric field is applied between the two substrates, the electrophoretic display device comprising: a partition wall formed on a one substrate with a predetermined pattern; and an adhesive layer formed on the partition wall, the adhesive layer being made of a thermoplastic material; wherein the other substrate is adhered to the adhesive layer on the partition wall.

According to the present invention, by using the adhesive agent made of a thermoplastic material, an electrophoretic display device can be manufactured by a simple process, i.e., at low costs.

In addition, since the adhesive agent made of a thermoplastic material does not have tackiness (stickiness) in a normal temperature, handling thereof is very easy. In addition, due to the adhesive agent free of tackiness (stickiness), there is no possibility that the display medium filled in each cell might adhere to the adhesive agent.

By using the adhesive agent made of a thermoplastic material, since the other substrate is reliably adhered by heating the adhesive agent, the adhering portion is prevented from being peeled off even when the other substrate is deformed. Namely, there is generated no gap into which the display medium is undesirably moved. In addition, since there is no possibility that impurities might enter the cell upon adhesion of the other substrate, deterioration of display quality can be avoided. Further, since the heat sealing agent after having been adhered to the other substrate does not have tackiness (stickiness) in a normal temperature, there is also no possibility that the display medium might adhere to the heat sealing agent. Also in this point, deterioration of display quality can be avoided.

BEST MODE FOR CARRYING OUT THE INVENTION

Figure 1:
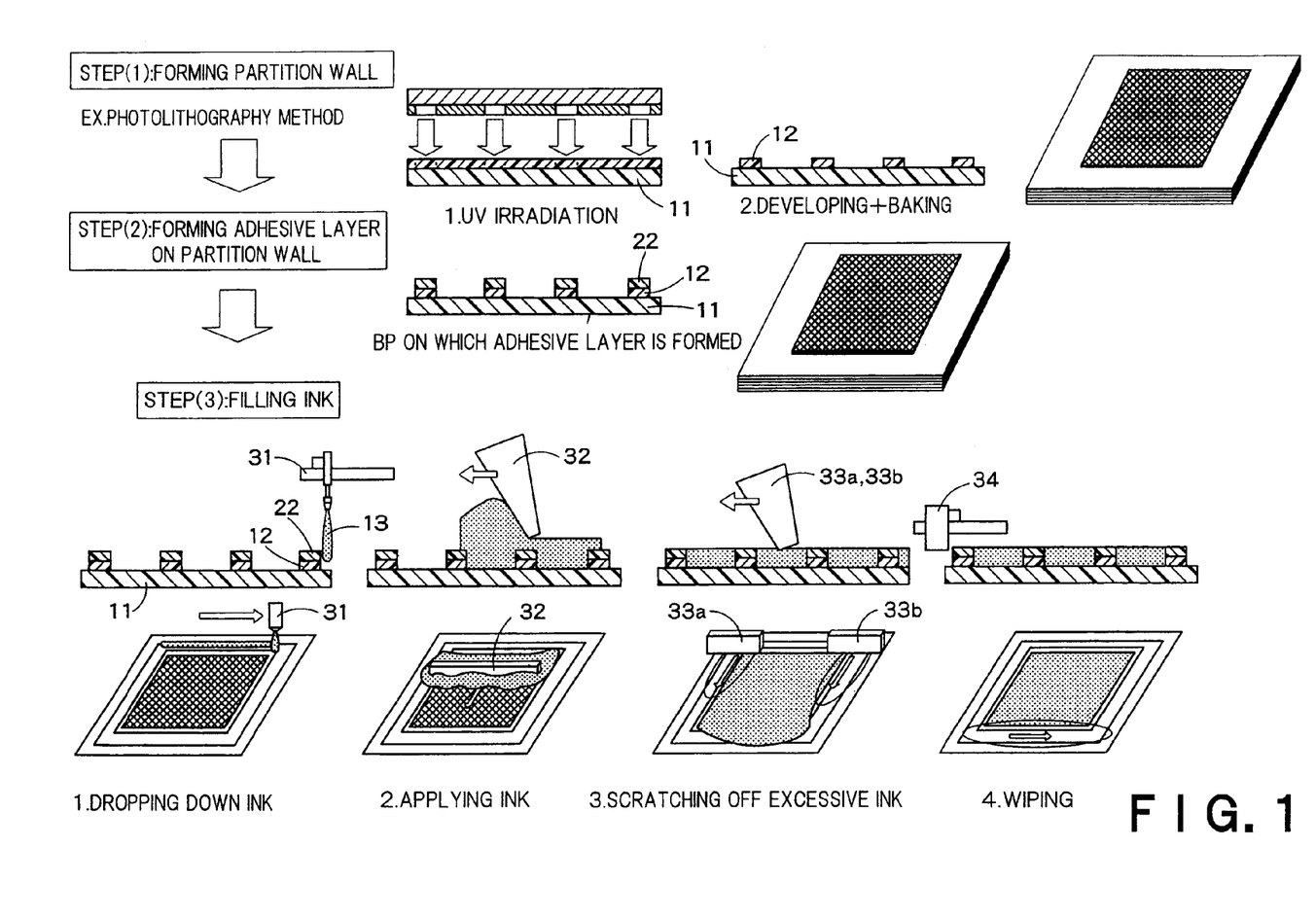
FIG. 1 is a view schematically showing a first half of a method of manufacturing an electrophoretic display device according to one embodiment of the present invention.

FIG. 1 is a view schematically showing a first half of a method of manufacturing an electrophoretic display device according to one embodiment of the present invention. As shown in FIG. 1, a partition wall 12 is formed with a predetermined pattern on an upper surface of a lower substrate (one substrate: back plane base member (BP)) that is generally placed horizontally, by means of an ultraviolet (UV) irradiation exposure process, a developing process and a baking process in this order, such as a photolithography method, (partition-wall forming step). The partition wall 12 is a member that defines lower surfaces and side surfaces of a plurality of cells described below.

A thickness of the partition wall is in a range between 5 μm and 100 μm, and preferably in a range between 10 μm and 50 μm.

Figure 2:
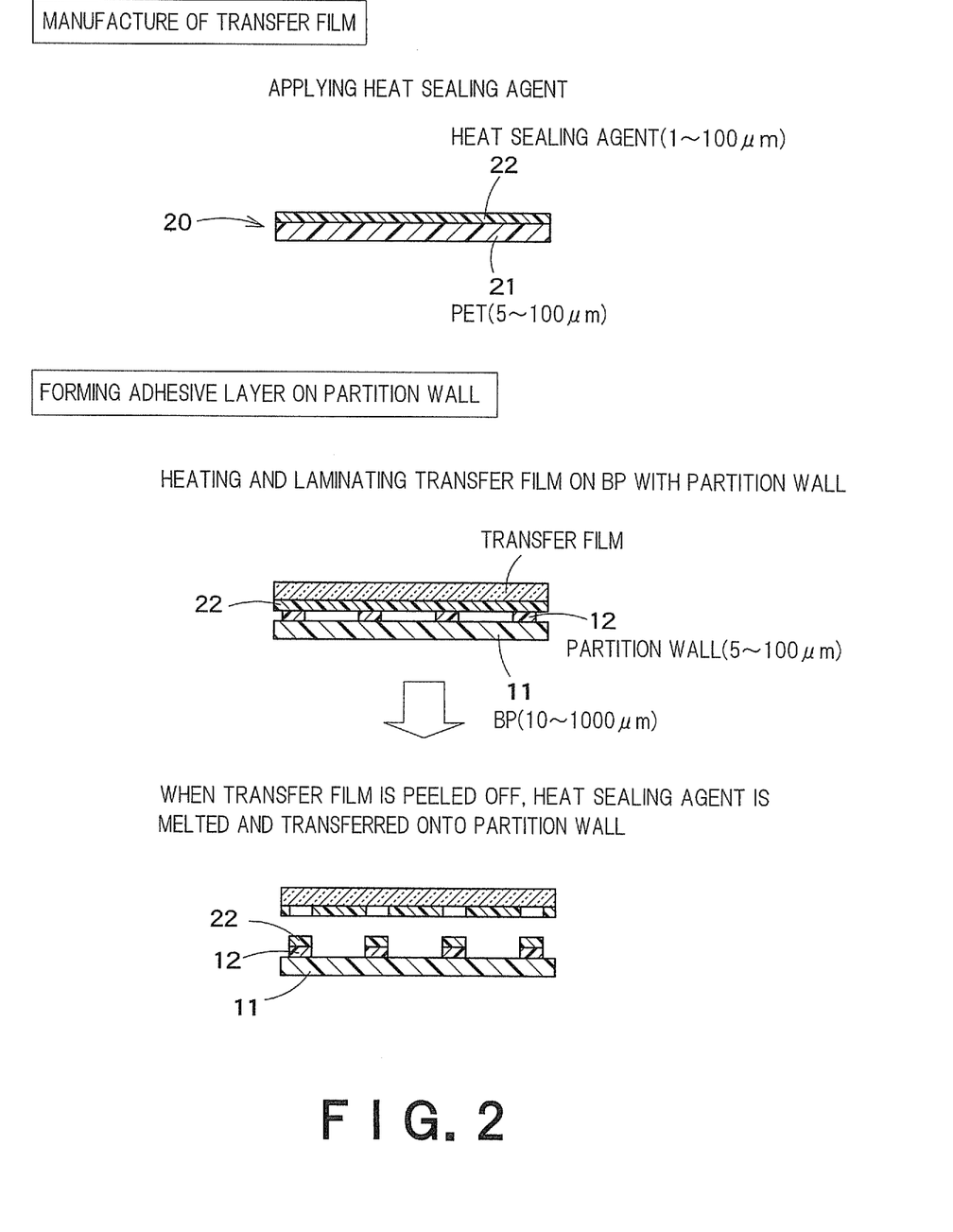
FIG. 2 is a view schematically showing an example of an adhesive-layer forming step.

Then, an adhesive layer is formed on the partition wall 12 (adhesive-layer forming step). FIG. 2 is a view schematically showing an example of the adhesive-layer forming step. In the adhesive-layer forming step shown in FIG. 2, a heat sealing agent 22 is applied to a transfer film base member 21 made of a polyethylene terephthalate (PET) film, so that a transfer film 20 is formed. The heat sealing agent 22 is applied thereto at a thickness of a range between 1 μm to 100 μm. Preferably, the heat sealing agent 22 is applied at a thickness of a range between 1 μm and 50 μm, and more preferably at a thickness of a range between 1 μm and 10 μm. As described below, the heat sealing agent 22 is made of a thermoplastic resin.

Thereafter, a surface of the transfer film 20 on which the heat sealing agent has been applied is placed on the partition wall 12. Then, under a state in which the surface of the transfer film 20 is subjected to only a self weight of the transfer film 20 or a state in which the surface of the transfer film 20 is subjected to a predetermined pressing force, the surface is heated to a temperature above its softening temperature (heating lamination: heat transfer). Thereafter, when the transfer film 20 is peeled off, the heat sealing agent 22, which has been heat-transferred to the partition wall 12, remains thereon.

The pressing force is preferably in a range between 0.01 MPa and 0.7 MPa. In particular, a range between 0.1 MPa and 0.4 MPa is preferable. When the pressing force is too small, transfer of the adhesive agent from the transfer film is insufficient. On the other hand, when the pressing force is too large, there is a possibility that the adhesive agent might collapse to enter a cell and/or that an adhesive agent other than the partition wall pattern might be transferred undesirably.

As long as the effect of the present invention can be provided, the heat sealing agent 22 may be heat-transferred onto all the partition wall 12, or the heat sealing agent 22 may be heat-transferred onto only a part of the partition wall 12. For example, the heat sealing agent 22 may be heat-transferred onto only a peripheral portion of the partition wall 12.

Returning to FIG. 1, after the adhesive layer (heat sealing agent) 22 has been formed, an ink 13 as a display medium is filled into each region partitioned by the partition wall 12 or the partition wall 12 and the adhesive layer 22 (display medium (ink) filling step). Herein, (1) the ink 13 is dropped down from a dispenser 31, an ink jet or a die coat, (2) the ink 13 is spread by a central squeegee 32, a doctor blade or a doctor knife so as to achieve an in-plane uniformity, (3) the excessive protruding ink is scratched off by opposite-end squeegees 33a and 33b, opposite-end doctor blades or opposite-end doctor knifes, which are made of a material such as urethane rubber, silicone rubber, synthetic rubber, metal or plastics, and (4) the excessive ink gathered on the one side is wiped off by a wiper 34.

Figure 3:
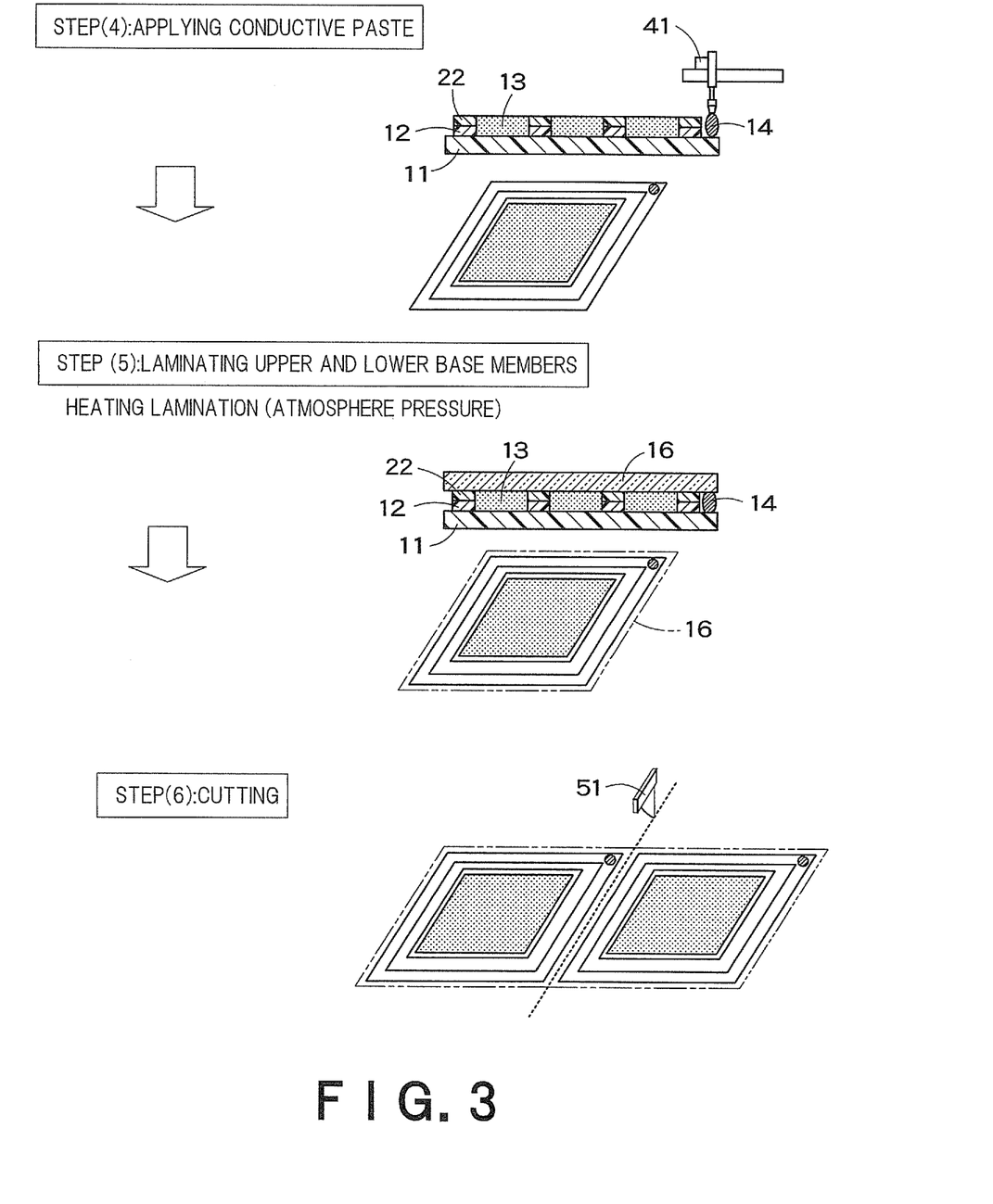
FIG. 3 is a view schematically showing a last half of the method of manufacturing an electrophoretic display device according to this embodiment.
Figure 4:
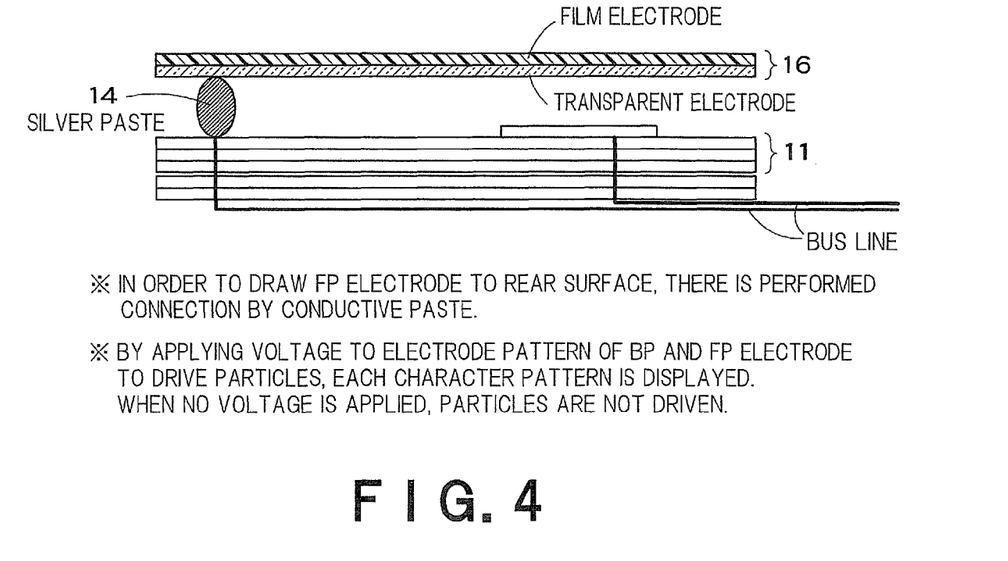
FIG. 4 is a schematic view for explaining a function of a conductive paste.

FIG. 3 is a view schematically showing a last half of the method of manufacturing a electrophoretic display device according to this embodiment. As shown in FIG. 3, after the ink-filling step, a conductive-paste applying step is performed. A conductive paste 14 is a metal paste such as a silver paste. The conductive paste 14 is applied to a predetermined position by means of a dispenser 41, an ink jet, a pad printing, a patting printing or a stamping printing. As shown in FIG. 4, the conductive paste 14 serves as a wiring for applying a voltage to an upper substrate 16 (the other substrate: front plane base member (FP)) which is described below.

After that, as shown in FIG. 3, the upper substrate 16 is adhered onto the adhesive layer 22 on the partition wall 12, such that the upper substrate 16 is opposed to the lower substrate 11 (the-other-substrate adhering step). Thus, the respective upper surfaces of the plurality of cells are defined, so that the display medium (ink 13) is enclosed within each cell. In the the-other-substrate adhering step, an adhesive force is obtained by heating the heat sealing agent 22 that has been transferred as the adhesive layer. More specifically, under a state in which the heat sealing agent 22 is subjected to only a self weight of the upper substrate 16 or a state in which the heat sealing agent 22 is subjected to a predetermined lamination pressure, the heat sealing agent 22 is heated to a temperature above its softening temperature so as to be softened, whereby the heat sealing agent 22 securely adheres the partition wall 12 and the upper substrate 16 to each other.

In terms of the resulted structure, the substrate adhered to the partition wall 12 through the heat sealing agent 22 is referred to as the upper substrate 16, and the substrate on which the partition wall 12 has been directly formed is referred to as the lower substrate 11.

Following thereto, as shown in FIG. 3, the resulted structure is cut into a predetermined size by a cutting unit 51 such as a guillotine, a blade slider, a laser-cutting unit or a laser cutter. Further, a periphery sealing process is performed, so that the manufacture of a desired electrophoretic display device is completed.

According to this embodiment, by using the heat sealing agent 22 as an adhesive agent, the partition wall 12 for forming the cells and the upper substrate 16 can be reliably adhered to each other, although by a simple process. In addition, since the transfer film 20 is used when the heat sealing agent 22 is heat-transferred, an accurate alignment thereof on the partition wall 12 is not necessary, and the heat sealing agent 22 can be reliably heat-transferred onto only the upper surface of the partition wall 12.

In addition, when the heat sealing agent 22, which has been heat-transferred as the adhesive layer, is made of a thermoplastic material, since such a heat sealing agent 22 has no tackiness (stickiness) in a room temperature, handling thereof is very easy. In addition, due to the heat sealing agent free of tackiness (stickiness), the subsequent display-medium filling step can be facilitated. For example, even when the display medium is filled by using a squeegee, a doctor blade or a doctor knife, there is no possibility that the display medium (ink 13) might adhere to the heat sealing agent 22.

Moreover, when the heat sealing agent 22 is made of a thermoplastic material, since the the upper substrate 16 is reliably adhered to the partition wall 12 by heating the heat sealing agent 22, the adhering portion is prevented from being peeled off even when the upper substrate 16 is deformed. Namely, there is generated no gap into which the display medium is undesirably moved. In addition, since there is no possibility that impurities might enter the cell upon adhesion of the upper substrate 16, deterioration of display quality can be avoided. Further, since the heat sealing agent 22 after having been adhered to the upper substrate 16 does not have tackiness (stickiness) in a normal temperature, there is also no possibility that the display medium is adhered to the heat sealing agent 22. Also in this point, deterioration of display quality can be avoided.

Next, there is described an example which was conducted for verifying that there is no display quality deterioration.

The lower substrate 11 used in this example was an electrode substrate having a Cu electrode, which was made of a polyethylene terephthalate (PET) film having a thickness of 100 μm (manufactured by TEIJIN DUPONT FILMS JAPAN LIMITED).

A negative photosensitive resin material (dry film resist manufactured by DMDF Co., Ltd.) was laminated at a thickness of 30 μm on the lower substrate 11. Then, the negative photosensitive resin material was prebaked at a temperature of 100° C. for one minute, and was exposed by using an exposure mask (exposure value: 500 mJ/cm$^2$). Thereafter, a spray development using 1% KOH solution was performed for 30 seconds, and the negative photosensitive resin material was post-baked at a temperature of 200° C. for 60 minutes, whereby the partition wall 12 was formed. The thus formed partition wall 12 was of a lattice shape having pitches of 600 μm and an aperture rate of 90%.

As the transfer film base member 21, a polyethylene terephthalate (PET) film having a thickness of 50 μm (manufactured by TEIJIN DUPONT FILMS JAPAN LIMITED) was used. The heat sealing agent 22 (VYLON UR1400 manufactured by TOYOBO CO., LTD.) was applied thereto by means of a dye coater, and was dried. Thus, the roll-shaped transfer film 20 having the adhesive layer 22 with a thickness of 10 μm was manufactured.

Then, the vicinity of the heat sealing agent 22 was heated to a temperature above its softening temperature, e.g., about 100° C., with the transfer film 20 being placed on the upper surface of the partition wall 12, while a predetermined pressing force was further applied thereto. Thus, the heat sealing agent 22 was heat-transferred onto the partition wall 12.

A thickness of the heat sealing agent 22 was 10 μm. A thickness of the partition wall 12 was 29 μm.

Following thereto, the ink 13 containing the following components as the display medium was dropped down from the dispense 31, and was squeezed by the central squeegee 32 (squeegee 1 manufactured by NEWLONG SEIMITSU KOGYO CO., LTD: made of urethane resin) so that pieces of the ink 13 were filled into the respective cells. The excessive ink protruding in a widthwise direction of the substrate was scratched off by the other opposed-end squeegees 33a and 33b (squeegees 2 manufactured by NEWLONG SEIMITSU KOGYO CO., LTD: made of urethane resin), and was wiped off by the roll wiper 34.

<Ink Components>
electrophoretic particles (titanium dioxide) . . . 60 wt. %
dispersion liquid . . . 40 wt. %

Then, a silver paste (manufactured by FUJIKURAKASEI CO., LTD.) was applied by the dispenser 41 in a dotted manner to a part of a periphery of the pattern (a square region of 2 mm×2 mm).

Thereafter, the upper substrate 16, which was an electrode substrate made of a polyethylene terephthalate (PET) film having a thickness of 100 μm (manufactured by TEIJIN DUPONT FILMS JAPAN LIMITED), which had on one surface thereof an indium tin oxide (ITO) deposition film (having a thickness of 0.2 μm) serving as a transparent electrode, was placed on the adhesive layer 22. Then, while a predetermined pressing force was further applied, the vicinity of the adhesive layer (heat sealing agent) 22 was heated, under an atmospheric pressure (under an atmosphere pressure environment), to a temperature of about 100° C. Thus, the adhesive layer 22 securely adhered the partition wall 12 and the upper substrate 16 to each other. The transparent electrode of the upper or lower substrate may be formed by a general film deposition method such as a sputtering method, a vacuum deposition method or a CVD method, with the use of indium tin oxide (ITO), zinc oxide (ZnO) or stannum oxide (SnO).

The pressing force is preferably in a range between 0.01 MPa and 0.7 MPa. In particular, a range between 0.1 MPa and 0.4 MPa is preferable. When the pressing force is too small, the upper and lower substrates will not sufficiently adhere to each other. On the other hand, when the pressing force is too large, there is a possibility that the adhesive agent might collapse to enter a cell so as to adhere to particles and/or that the ink might outflow to degrade a contrast, inviting an adverse effect on the display performance.

After that, the obtained object was cut into a predetermined size. Then, an ultraviolet curing resin (manufactured by E·H·C Kabushiki Kaisha: LCB-610) was applied using a dispenser (not shown) to peripheral portions of the lower and upper electrode substrates 11 and 16 for sealing. The resin was exposed to ultraviolet light (exposure value: 700 mJ/cm$^2$) so as to be cured (peripheral-portion sealing process).

A contrast of the thus obtained electrophoretic display device was observed after direct current voltage of 80 V had been applied between the upper and lower electrodes, and a significantly satisfactory result could be obtained.

In the above example, although the transfer film 20 was coated with VYLON UR1400 (manufactured by TOYOBO CO., LTD) as the heat sealing agent 22, VYLON UR3200 (manufactured by TOYOBO CO., LTD.) may be used instead of VYLON UR1400. Also when VYLON UR3200 is used, a temperature of about 100° C. is employed as a temperature for the heating lamination. The inventor of the present invention has found that, when the heating lamination temperature is too high, the material may shrink to cause "undulation", so that the adhesion between the heat sealing agent and the substrate is impaired. According to the inventor of the present invention, a temperature not more than 150° C. is preferable, a temperature not more than 120° C. is more preferable, and a temperature not more than 80° C. is most preferable.

However, it has been found that, in a case of using VYLON UR3200, when the transfer film 20 is peeled off under a normal temperature environment, a desired shape accuracy of the partition wall pattern cannot be obtained. The inventor of the present invention has found that, also when the transfer film 20 is peeled off, increase in temperature by heating is effective.

Figure 5:
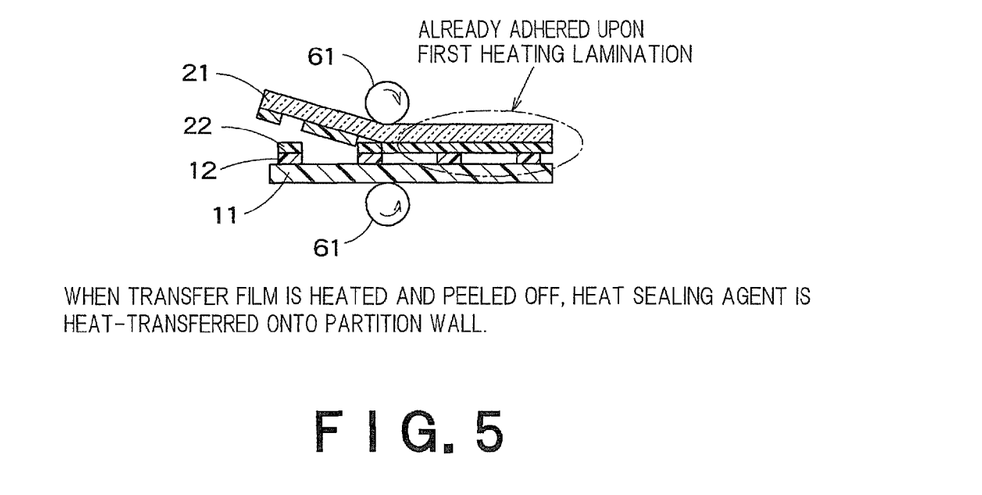
FIG. 5 is a schematic view for explaining an example of a step of peeling off a transfer film.

To be specific, as shown in FIG. 5, when the transfer film 20 was peeled off, it was effective that the heat sealing agent 22 was heated by upper and lower heating rolls 61 through the transfer film base member 21 and the lower substrate 11. An experiment result relating to a heating temperature in this case is shown in the below table. As items about transferability, the following four items were evaluated. Namely, the items are: a shape accuracy of the partition wall pattern (x: no heat sealing agent was transferred, Δ: heat sealing agent was partially transferred, ○: heat sealing agent was fully transferred), whether the heat sealing agent dripped into the partition wall (x: heat sealing agent dripped, ○: no heat sealing agent dripped), whether the heat sealing agent was thready (x heat sealing agent was thready, Δ: heat sealing agent was partially thready, ○: heat sealing agent was not thready), and an unevenness of film thickness (x: film thickness was uneven, ○: film thickness was even). In addition, an adhesiveness was also evaluated (x: substrate and heat sealing agent were not adhered to each other, Δ: substrate and heat sealing agent were easily peeled off from each other, ○: substrate and heat sealing agent were well adhered to each other).

The three items, i.e., the shape accuracy of the partition wall pattern, whether the heat sealing agent dripped into the partition wall or not, and whether the heat sealing agent was thready or not, were evaluated by observing an appearance with the use of an optical microscope. The unevenness of a film thickness was evaluated from a measurement result by using a Dektak stylus profilometer. The adhesiveness was evaluated based on T-peel test in accordance with JIS standard K 6854-3 using tensilon.

TABLE 1

| Material | Heating Lamination Condition Temperature (° C.) | Heating Peel Condition Temperature (° C.) | Result Transferability | | | | |
|---|---|---|---|---|---|---|---|
| | | | Pattern Shape | Dripping into Partition Wall | Threadiness | Unevenness of Film Thickness | Adhesiveness |
| UR3200 | 100 | Normal Temp. (without heating) | x | — | — | — | — |
| | 100 | 80 | Δ | ○ | x | x | x |
| | 100 | 100 | ○ | ○ | ○ | ○ | ○ |
| | 100 | 120 | ○ | x | ○ | ○ | ○ |
| Judgment Standard | | | x | Δ | | | ○ |
| Pattern Shape | | | Not transferred | Partially transferred | | | Fully transferred |
| Dripping into Partition Wall | | | Dripped | — | | | Not dripped |
| Threadiness | | | Thready | Partially thready | | | Not thready |
| Unevenness of Film Thickness | | | Uneven | — | | | Even |
| Adhesiveness | | | Not adhered | Easily peeled | | | Well adhered |

From the experiment result shown in the above table, it can be understood that heating of the transfer film 20 upon peeling off thereof is effective in improvement of transferability and adhesiveness. In particular, it can be understood that heating of the transfer film 20 to a temperature of about 100° C. is preferable.

In FIG. 5, the transfer film base member 21 is guided along a trajectory that is floated upward (at an angle of about 90 degrees) from a horizontal trajectory. However, the peeling can be also realized by guiding the lower substrate 11 along a trajectory that is sunk downward (at an angle of about 90 degrees) from the horizontal trajectory. In this case, although there are different impacts by gravity, the experiment results relating to a temperature suitable for peeling did not differ from each other.

Further, in the above embodiment, the heat sealing agent was once heated to be laminated, and then the heat sealing agent was again heated to be peeled off. However, from the result showing that a suitable heating temperature in the heating lamination step and a suitable heating temperature in the heating peel step are substantially equal to each other, it was confirmed that the heating lamination step and the heating peel step can be performed in an integrated manner. Specifically, immediately after the transfer film base member 21 has been heated for lamination, the transfer film base member 21 can be guided to be floated upward from the horizontal trajectory, or the lower substrate 11 can be guided to be sunk downward, whereby the heating lamination step and the heating peel step can be simultaneously performed in an integrated manner.

Next, materials and properties of the respective members of the electrophoretic display device as an object to be manufactured by the present invention are described in more detail.

As the lower substrate 11, there may be used a substrate made of a resin film, a resin plate, a glass, an epoxy glass or a ceramic, which has, on a surface thereof, an electrode made of a conductive material such as a metal. Alternatively, a metal plate or a light-transmitting base member may be used. As an opaque base member, there may be used an opaque glass base member having a roughened surface that is not an electrode surface, an opaque base member with a metal film deposited on a surface that is not an electrode surface, or an opaque resin base member in which dye or pigment is dispersed.

A thickness of the lower substrate 11 is preferably in a range between 10 μm and 1 mm. When the thickness is smaller than 10 μm, a strength suited for a panel cannot be obtained, whereby the substrate is likely to be broken. On the other hand, when the thickness is larger than 1 mm, a weight of the panel is too heavy to handle, as well as a cost therefor increases.

The preferred range of thickness in which the substrate is not likely to be broken and easy to handle is between 50 μm and 300 μm.

A front surface of the lower substrate 11 may be subjected to an anti-oxidation treatment by plating. A rear surface (outside) of the lower substrate 11 may be provided with a barrier layer. A function of the barrier layer is to prevent the display deterioration caused by the ink that absorbs moisture. The barrier layer of the upper substrate may be transparent and the barrier layer of the lower substrate may either be transparent or opaque. The barrier layer may be obtained by depositing an inorganic film. Alternatively, a film having a barrier layer previously formed thereon may be laminated. An electrode pattern of the lower substrate 11 may be formed by a photolithography method, a laser drawing method, an ink jet method, a screen printing method, a flexographic printing method, etc. A TFT substrate may be used as the lower substrate 11.

The lower substrate 11 may be either of a roll type or of a sheet type.

The partition wall 12 may be made of an ultraviolet curing resin, a thermosetting resin or a cold setting resin. As described above, the partition wall 12 is preferably formed to have a thickness of a range between 5 μm and 100 μm. When the thickness is not more than 5 μm, an amount of ink to be filled is small, whereby a sufficient display property, in particular, a contrast cannot be obtained. On the other hand, when the thickness is not less than 100 μm, the thickness of the panel is too large, whereby a drive voltage excessively increases. From a viewpoint of a low drive voltage and an excellent display property, the thickness of a range between 10 μm and 50 μm is preferable.

The pattern shape of the partition wall 12 is basically of an optional shape, e.g., a circular shape, a lattice shape and a polygonal shape. An aperture rate is preferably not less than 70%, and more preferably not less than 90%. The higher the aperture rate is, the larger a displayable area is, whereby a high contrast can be obtained.

As a method of forming the partition wall 12, a shape transfer method such as embossing may be employed, in addition to a photolithography method. Further, there may be employed a method in which a meshed structure is firstly manufactured as a partition wall, and then the meshed structure is attached to the lower substrate 11.

The heat sealing agent 22 is preferably made of a thermoplastic material which can soften when heated and can solidify when cooled. When heating and cooling are repeated, the thermoplastic material reversibly maintains plasticity. When a heat sealing agent made of a thermoplastic material is used as an adhesive agent, by heating the heat sealing agent, which has solidified on the transfer film base member, to a temperature above its softening temperature such that the heat sealing agent softens, the heat sealing agent can be reliably heat-transferred onto only the upper surface of the partition wall. In addition, when the heat-transferred heat sealing agent is cooled to a normal temperature, the heat sealing agent again solidifies so as to be free of tackiness (stickiness). Thus, handling thereof is very easy. Moreover, since the solid heat sealing agent does not have tackiness (stickiness), there is no possibility that the display medium filled in each cell might adhere to the heat sealing agent. Further, by heating again the heat sealing agent, which has solidified on the upper surface of the partition wall, to a temperature above its softening temperature such that the heat sealing agent softens, the heat sealing agent revives tackiness (stickiness). Thus, the other substrate can be reliably adhered thereto. After the other substrate has been adhered to the heat sealing agent, the heat sealing agent again becomes free of tackiness (stickiness) in a room temperature. Therefore, there is also no possibility that the display medium might adhere to the heat sealing agent, which avoids deterioration of display quality. To be specific, there is mainly used a resin containing, as a main component, a thermoplastic base polymer, such as ethylene-vinyl acetate copolymer, polyester, polyamide, polyolefin or polyurethane; or a thermoplastic elastomer such as natural rubber, styrene-butadiene block copolymer, styrene-isoprene block copolymer, styrene-ethylene-butylene-styrene block copolymer or styrene-ethylene-propylene-styrene block copolymer; to which an adhesiveness imparting resin and/or a plasticizer are/is blended.

Depending on a kind of the heat sealing agent 22, the softening temperature of the heat sealing agent 22 may be a glass transition temperature (Tg) of the heat sealing agent 22 or a melting temperature (Tm) thereof. The softening temperature is preferably not more than 150° C., more preferably not more than 120° C., and most preferably not more than 80° C. In particular, when the softening temperature of the heat sealing agent 22 is higher than a glass transition temperature of the base member films 11 and 16, the base member films 11 and 16 may undesirably shrink to generate wrinkles. Further, when the softening temperature of the heat sealing agent 22 is high, since adhesiveness between a rib and the base members is decreased by an undulation caused by the shrinkage of the base member films 11 and 16, the rib is undesirably peeled off from the base member upon the heating peel process. In addition, when the temperature at which the heat sealing agent 22 softens is higher than a thermal decomposition temperature of the ink 13 (the thermal decomposition herein means that a chemical property (aspect) of the ink 13 changes because of volatilization of a solvent, an addition agent and/or particles contained in the ink 13 by heating), there is a possibility that the thermal decomposition of the ink 13 might undesirably impair the display performance.

As described above, the heat sealing agent 22 is preferably formed to have a thickness of a range between 1 μm and 100 μm. When the thickness is not more than 1 μm, a sufficient adhesive performance cannot be obtained. On the other hand, when the thickness is not less than 100 μm, the thickness of the panel is too large, whereby a drive voltage excessively increases. From a viewpoint of a well adhesiveness, a low drive voltage and an excellent display property, the thickness is preferably in a range between 1 μm and 50 μm and more preferably in a range between 1 μm and 10 μm.

In order to increase the adhesiveness between the partition wall 12 and the heat sealing agent 22, the partition wall 12 may be subjected to a surface treatment such as an ultraviolet irradiation treatment or a plasma treatment, or a primer may be formed on the partition wall 12. Alternatively, a silane coupling agent may be added to the heat sealing agent 22.

As the display medium (ink 13), various known materials may be used.

As the upper substrate 16, there may be typically used a transparent film made of PE, PET, PES, PEN, etc., which has a transparent electrode made of ITO, ZnO, etc. The transparent electrode may be formed by a coating method, a deposition method and so on.

Similarly to the thickness of the lower substrate 11, a thickness of the upper substrate 16 is preferably in a range between 10 μm and 1 mm. When the thickness is smaller than 10 μm, a strength suited for a panel cannot be obtained, whereby the substrate is likely to be broken. On the other hand, when the thickness is larger than 1 mm, a weight of the panel is too heavy to handle, as well as a cost therefor increases. The preferred range of thickness in which the substrate is not likely to be broken and easy to handle is between 50 μm and 300 μm.

A further function layer may be added to the upper substrate 16. For example, a barrier film may be laminated on the surface of the upper substrate 16. When a transparent film on which a barrier layer of a transparent inorganic film has been previously formed by deposition or the like, is employed as the upper substrate 16, the same function can be exerted. Alternatively, an ultraviolet cut-off (protection) film may be laminated on the surface of the upper substrate 16. When the surface of the upper substrate 16 is subjected to an ultraviolet cut-off process, the same function can be exerted. An AG layer (anti-glare layer), an HC layer (flaw prevention layer) and/or an AR layer (antireflection layer) may be added as a further surface coating layer.

The upper substrate 16 may be either of a roll type or of a sheet type.

The peripheral-portion sealing agent may be made of a thermosetting resin, a cold setting resin, a heat sealing resin and so on, in addition to an ultraviolet curing resin. The peripheral-portion sealing agent made of one of such resins is applied to the peripheral portions of the lower and upper electrode substrates 11 and 16, by means of a dispenser, or various printing methods, or a thermal pressure joining.

What is claimed is:

1. A method of manufacturing an electrophoretic display device including a plurality of cells between opposed two substrates at least one of which is transparent, a display medium containing electrophoretic elements of at least one or more kind(s) being enclosed in each cell, and the display medium being configured to display predetermined information when a predetermined electric field is applied between the two substrates, the method of manufacturing an electrophoretic display device comprising:

forming a partition wall on a one substrate with a predetermined pattern;

forming an adhesive layer on the partition wall;

filling each region as a cell, which has been partitioned by the partition wall, with a display medium, after having formed the adhesive layer; and     adhering the other substrate onto the adhesive layer on the partition wall so as to enclose the display medium;

wherein the forming of the adhesive layer is performed, with the use of a transfer film with a heat sealing agent formed thereon, by heat-transferring the heat sealing agent, and     the adhering of the other substrate includes heating the heat sealing agent for again softening the heat sealing agent, which has been transferred as the adhesive layer, so as to obtain an adhesive force.

2. The method of manufacturing an electrophoretic display device according to claim 1, wherein     the forming of the adhesive layer further includes peeling off the transfer film while heating the transfer film.

3. The method of manufacturing an electrophoretic display device according to claim 2, wherein     in the forming of the adhesive layer, the heat sealing agent comprises a thermoplastic material.

4. The method of manufacturing an electrophoretic display device according to claim 1, wherein     in the forming of the adhesive layer, the heat sealing agent comprises a thermoplastic material.

5. The method of manufacturing an electrophoretic display device according to claim 1, wherein     the adhering of the other substrate further includes pressurizing the other substrate to obtain an adhesive force, by applying thereto a predetermined pressurizing force.

6. An apparatus for manufacturing an electrophoretic display device including a plurality of cells between opposed two substrates at least one of which is transparent, a display medium containing electrophoretic elements of at least one or more kind(s) being enclosed in each cell, and the display medium being configured to display predetermined information when a predetermined electric field is applied between the two substrates, the apparatus for manufacturing an electrophoretic display device comprising:

a partition-wall forming unit configured to form a partition wall on a one substrate with a predetermined pattern;

an adhesive-layer forming unit configured to form an adhesive layer on the partition wall;

a display-medium filling unit configured to fill each region as a cell, which has been partitioned by the partition wall, with a display medium, after the adhesive layer has been formed; and     a the-other-substrate adhering unit configured to adhere the other substrate onto the adhesive layer on the partition wall so as to enclose the display medium;

wherein the adhesive-layer forming unit is configured to heat-transfer, with the use of a transfer film with a heat sealing agent formed thereon, the heat sealing agent; and     the the-other-substrate adhering unit is configured to again soften the heat sealing agent that has been transferred as the adhesive layer.

7. The apparatus for manufacturing an electrophoretic display device according to claim 6, wherein     the adhesive-layer forming unit is further configured to peel off the transfer film while heating the transfer film.

8. The apparatus for manufacturing an electrophoretic display device according to claim 7, wherein     in the adhesive-layer forming unit, the heat sealing agent is made of a thermoplastic material.

9. The apparatus for manufacturing an electrophoretic display device according to claim 6, wherein     in the adhesive-layer forming unit, the heat sealing agent is made of a thermoplastic material.

10. The apparatus for manufacturing an electrophoretic display device according to claim 6, wherein     the the-other-substrate adhering unit is further configured to apply a predetermined pressurizing force.

\* \* \* \* \*